Dec. 7, 1954  A. MARQUIS  2,696,159
COFFEE MAKER AND THE LIKE
Filed July 24, 1952
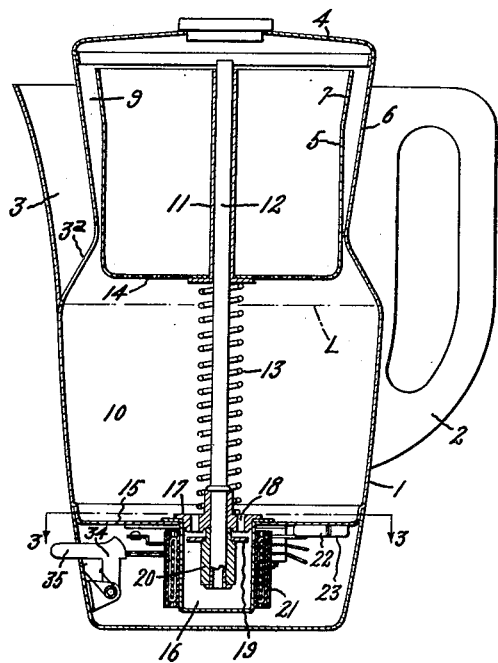
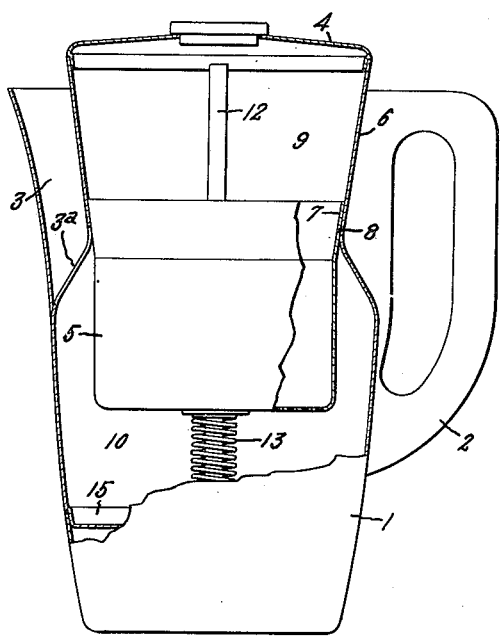
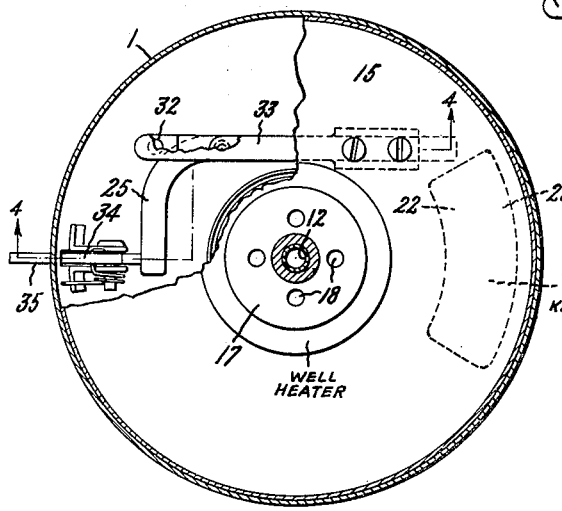
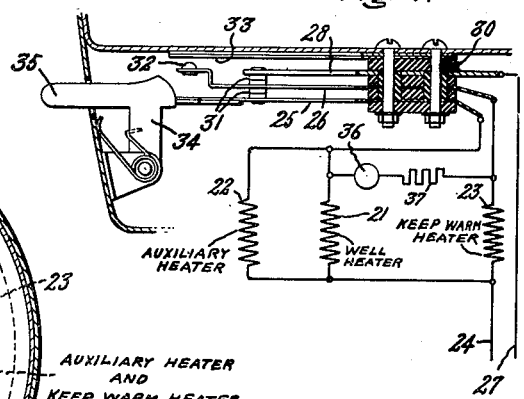
Inventor:
Arthur Marquis
by William B. Edwards, Jr.
His Attorney.

# United States Patent Office 2,696,159
Patented Dec. 7, 1954

2,696,159
COFFEE MAKER AND THE LIKE

Arthur Marquis, Schenectady, N. Y., assignor to General Electric Company, a corporation of New York Application July 24, 1952, Serial No. 300,651

3 Claims. (Cl. 99—311)

The present invention relates to coffee makers and the like and has for its object to provide an improved device of this character which is simple in structure, capable of being manufactured at low cost, and comprises few easily cleaned parts; and which at the same time is reliable in operation and makes a satisfactory brew.

According to my invention I provide a coffee basket which is spring supported in the brew-holding vessel for movement vertically with respect thereto, it and the vessel being shaped to define a valve for separating the vessel into two compartments when the basket is lowered with respect to the vessel; and in connection therewith I provide means for pumping the heated water from the lower portion of the vessel to the upper portion from where it drips back through the coffee to the lower portion again and automatic means for effecting operation of the coffee maker.

In the drawing, Fig. 1 is a sectional view of a coffee maker embodying the invention, the ground coffee-holding basket being in one position; Fig. 2 is a view similar to Fig. 1 showing the coffee-holding basket in another position; Fig. 3 is a sectional view, partly broken away, taken on line 3—3 of Fig. 1; and Fig. 4 is a sectional view taken on line 4—4 of Fig. 3, and having in connection therewith a wiring diagram.

Referring to the drawing, 1 indicates the brew-holding vessel having a handle 2, a pouring spout 3 which opens into the vessel at 3a, and a removable cover 4, and 5 indicates the coffee holding basket. Vessel 1 and basket 5 are shaped to define tapered walls 6 and 7 which when basket 5 moves downward in the vessel from the position shown in Fig. 1 to the position shown in Fig. 2 engage, as is indicated at 8 in Fig. 2, to divide the vessel into two chambers, an upper chamber 9 and a lower chamber 10. In substance, tapered wall 6 defines a valve seat on the vessel against which tapered wall 7 seats, the basket thus forming a movable valve body. Basket 5 is provided with a central guide tube 11 through which a fountain tube 12 extends and the basket is slidably supported on tube 12 by a spring 13 which surrounds fountain tube 12 beneath the basket. The basket is imperforate except for a limited number of small holes at its lower portion, all preferably in the bottom wall of the basket as indicated at 14.

In making brew in the coffee maker, the desired amount of water is placed in the vessel, it being filled to a level below the region indicated at 8 (i. e., to the level indicated at L) and the needed amount of ground coffee is placed in basket 5. At this time the basket stands in the position shown in Fig. 1, it being supported by spring 13. Heat is now supplied to the bottom of vessel 1 and the water is pumped from the bottom of the vessel up through fountain tube 12 to basket 5. As water accumulates in the basket, its weight causes the basket to be lowered from its Fig. 1 position to the Fig. 2 position wherein tapered walls 6 and 7, which in substance form a valve, are in engagement. In this position, the basket forms a partition wall which divides the vessel into the two chambers 9 and 10. Spring 13 is of a strength such that the basket is lowered to engage seat 6 when a relatively small amount of water has accumulated in it, an amount less than that required to fill it. The means for pumping the water up through fountain tube 12 is of a type which pumps rapidly as compared to the rate at which water can drip back through openings 14 in the basket so that substantially all the water in the chamber 10 is now quickly pumped up into chamber 9. When this has taken place, the heating is discontinued thus permitting the water to drip back through the openings 14 to chamber 10. When all or most of the water has dripped back, basket 5 will have become sufficiently light in weight to permit spring 13 to move it back to its Fig. 1 position where it stands above the level L of the now coffee brew. Thus it will be seen that the ground coffee is removed from contact with the brew.

In substance, it will be seen that my improved coffee maker is a combined percolator and drip coffee maker, a fountain being utilized to pump the water from the lower portion of the brew vessel to the upper portion after which the water drips back through the ground coffee in the basket to make the brew.

Any suitable form of percolator pump may be used for effecting the transfer of the water from chamber 10 up through fountain tube 12 to chamber 9. For example, if the vessel is to be heated on a stove utilizing a gas burner or an electric stove heating unit, the lower end of fountain tube 12 may be connected with any of the known types of conical shaped pump discs. However, the construction described above is well adapted for use in an automatic electric coffee maker and in the drawing I have illustrated it as embodied in an improved coffee maker construction of this type. To this end there is provided at the lower end of vessel 1 a partition wall 15 at the central portion of which is a pump well 16 closed at its lower end and opening into chamber 10 at its upper end. On the lower end of tube 12 is a disc 17 which seats in the well opening as shown in Fig. 1 and is provided with openings 18 for flow of water from chamber 10 into the well. Cooperating with openings 18 is a valve disc 19 supported on tube 12 by a shoulder on a sleeve 20 fixed on the lower end of the tube. Disc 19 is normally spaced away from openings 18 as shown in Fig. 1 but due to pressure built up in well 16 by formation of steam in the well it may be forced upward to close openings 18 to thus stop the flow of water from chamber 10 into the well. Surrounding well 16 and insulated from it is a well heating winding 21 and fastened to the underside of partition wall 15 is an insulating structure comprising an auxiliary heating winding 22 and a "Keep Warm" heating winding 23. The several heating windings may have wattages suitable for their respective functions. For example, the heating unit 21 which heats the water in well 16 to effect pumping may have a capacity of the order of 300 watts, the auxiliary heater 22, the function of which is to assist in heating up the main body of water in chamber 10, may have a capacity of the order of 200 watts, and the "Keep Warm" heating unit 23, the function of which is to keep the brew warm after it has been made, may have a capacity of the order of 30 watts. It will be understood, of course, that these figures are given only by way of example for one coffee maker size and that the values will vary in accordance with the size of the coffee maker in any particular instance.

Referring to Fig. 4, windings 21 and 22 are connected in parallel with each other to line 24 and to a spring switch blade 25 and winding 23 is connected to line 24 and to a spring switch blade 26. The other line 27 is connected to spring switch blade 28. The three switch blades are insulated from each other being carried by mounting blocks 30 attached to the underside of wall 15 as shown in Fig. 4 and are biased into engagement with each other as shown in Fig. 4. At their free ends they have normally engaging contacts as indicated at 31. Blade 26 has at its free end an extension on which is a button 32 of insulating material adapted to be engaged by the free end of a bimetallic thermostatic strip 33 fixed to the underside of wall 15 along with the contact blades. Contact blade 25 at its free end has an extension adapted to be engaged by a spring pressed hook 34 pivoted to the wall of vessel 1 and provided with an actuating finger 35 which projects out through the vessel wall as clearly shown in Fig. 4. Connected in parallel with heating winding 23 and in series with heating winding 21 is an indicating means comprising a neon glow-lamp 36 in series with a ballast resistance 37.

When brew is to be made after the manner already described, lines 24, 27 are connected to a source of electricity thus putting all three heating windings in circuit in parallel with each other. The water in chamber 10 is thus heated and when hot pumps up into chamber 9 in the well understood operational manner of percolator means of this type. After all or substantially all the water is pumped up into chamber 9, bottom wall 15 increases in temperature rather rapidly since the heat now supplied to it is not being dissipated in the water. This effects the raising of the temperature of bimetal strip 33 causing it to deflect downward into engagement with button 32 and to lower the free ends of contact blades 26 and 25, the same being lowered to a point such that hook 34 springs over the end of blade 25. Downward movement of blades 25 and 26 separates blade 26 from blade 28, thus opening the circuit of all three windings. As a result, bottom wall 15 cools down and bimetal strip 23 returns to its position against the bottom of the wall. This permits contact blade 26 to move back into engagement with blade 28 to again close the circuit on the "Keep Warm" heating winding 23. Hook 34 holds blade 25, permitting blade 26 to move away from engagement with it to open the circuit at this point on heating windings 21 and 22. At this time the neon lamp 36 will glow, indicating that the brewing operation has been completed.

When the coffee maker is to be used again, finger piece 35 is pressed down to move the catch from engagement with blade 25 permitting the blade to return to its normal position as shown in Fig. 4.

What I claim as new and desire to secure by Letters Patent of the United States is:

1. In a coffee maker, a vessel having its wall at a point between its upper and lower ends shaped to define a valve seat, percolating pump means in the vessel including a fountain stem, a basket for holding ground coffee slidably mounted on the upper portion of said stem, the side wall of said basket being shaped to provide a valve adapted to seat on said valve seat when the basket moves downward, said valve seat being spaced from the upper end of the vessel a distance such that when the valve on the basket engages such valve seat the vessel is divided into upper and lower chambers, the upper chamber having a capacity above the bottom wall of the basket such that it will hold a major portion of the water to be used in a brew operation, and spring means which engages said basket for biasing it to a position wherein its valve is out of engagement with said valve seat, said basket being provided with openings through which water may drip from the basket to the lower portion of the vessel and said spring having strength such that when the basket has therein a predetermined amount of water the weight of the water will effect downward movement of the basket to bring the valve on the basket into engagement with said seat.

2. In a coffee maker, a vessel the side wall of which at a point intermediate between its upper and lower ends is flared outwardly to provide an upwardly facing seat, percolating pump means in the vessel including a fountain stem, a basket for holding ground coffee slidably mounted on the upper end of said stem, the side wall of said basket being flared outwardly to provide a wall portion adapted to engage said seat to divide the vessel into upper and lower chambers, said upwardly facing seat being spaced from the upper end of the vessel a distance such that when the outwardly flared portion of said basket engages said seat the upper chamber formed in the vessel above the bottom of the basket has a capacity such that it will hold a major portion of the water to be used in a brew operation, said basket being provided with water drain opening, and spring means which engages said basket for biasing it to a position wherein its outwardly flared wall portion is out of engagement with said seat, said basket being adapted to be lowered by accumulation of water therein to bring it into engagement with said seat.

3. In a coffee maker, a vessel having its side wall between the top and bottom shaped to define an upwardly facing seat, a fountain tube in the vessel, a basket slidably mounted on the upper end of said tube, said basket being shaped to provide a wall adapted to seat against said upwardly facing seat to divide the vessel into upper and lower portions, said basket having drip openings in its lower portion, spring means biasing said basket to a position wherein its shaped wall is spaced from said seat, it being adapted to be moved into engagement therewith by the weight of water accumulated in the basket, and pump means connected to the lower end of said fountain tube for transferring water from the lower portion of the vessel up through said tube to the basket and the upper portion of said vessel, the upper portion of the vessel when said shaped portion of the basket engages said seat having a capacity such that it will hold a major portion of the water to be used in a brew operation.

References Cited in the file of this patent

UNITED STATES PATENTS

| Number | Name | Date |
|---|---|---|
| 61,122 | Tilden | Jan. 8, 1867 |
| 1,290,546 | Hachmann | Jan. 7, 1919 |
| 1,916,369 | Harpster | July 4, 1933 |
| 2,046,710 | Umstott | July 7, 1936 |
| 2,103,704 | Wygodsky | Dec. 28, 1937 |
| 2,213,723 | Smith | Sept. 3, 1940 |
| 2,262,286 | Ireland | Nov. 11, 1941 |
| 2,312,555 | Jepson | Mar. 2, 1943 |
| 2,388,335 | McCullough | Nov. 6, 1945 |

FOREIGN PATENTS

| Number | Country | Date |
|---|---|---|
| 684,886 | France | Mar. 24, 1930 |